(12) United States Patent
Blackburn

(10) Patent No.: US 7,752,981 B2
(45) Date of Patent: Jul. 13, 2010

(54) ANGULAR MOUSE SUPPORT

(75) Inventor: Nicholas L. Blackburn, Wellesley (CA)

(73) Assignee: COMPX International Inc.

( * ) Notice: Subject to any disclaimer, the term of this patent is extended or adjusted under 35 U.S.C. 154(b) by 265 days.

(21) Appl. No.: 11/185,758

(22) Filed: Jul. 21, 2005

(65) Prior Publication Data

US 2006/0016939 A1 Jan. 26, 2006

Related U.S. Application Data

(60) Provisional application No. 60/589,586, filed on Jul. 21, 2004.

(51) Int. Cl.
*A47B 57/00* (2006.01)
(52) U.S. Cl. .................. 108/93; 108/102; 248/118
(58) Field of Classification Search .................. 108/93, 108/92, 5–6, 9, 102; 248/118, 118.1, 118.3, 248/118.5
See application file for complete search history.

(56) References Cited

U.S. PATENT DOCUMENTS

| | | | | | |
|---|---|---|---|---|---|
| 5,655,743 | A | * | 8/1997 | Gillis | 248/346.01 |
| 6,497,391 | B1 | * | 12/2002 | Timm | 248/118.1 |
| 6,682,038 | B2 | * | 1/2004 | Golynsky | 248/346.01 |
| 6,694,895 | B2 | * | 2/2004 | Gillis | 108/102 |
| 6,749,158 | B2 | * | 6/2004 | Timm | 248/118 |
| 6,912,119 | B2 | * | 6/2005 | Maloney | 361/680 |

* cited by examiner

*Primary Examiner*—Hanh V Tran
(74) *Attorney, Agent, or Firm*—Daryl W. Schnurr

(57) ABSTRACT

A keyboard tray can be mounted on an articulating arm and has a passage extending from side to side. A mouse support is slidably mounted within the passage and has a closed position and an extended position. When extended, an outer end of the mouse support can be pivoted forward relative to the tray.

20 Claims, 14 Drawing Sheets

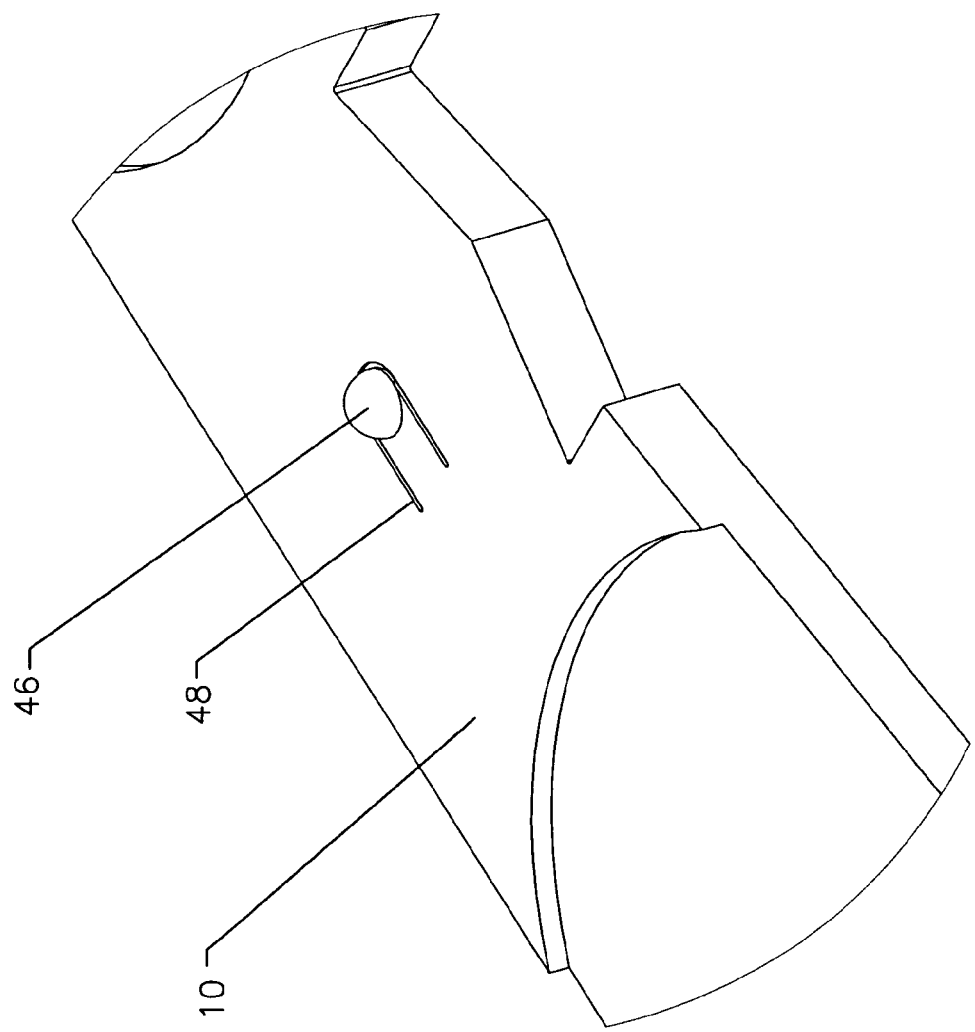

ANGULAR MOUSE SUPPORT

Priority is claimed based upon U.S. provisional application Ser. No. 60/589,586 filed on Jul. 21, 2004.

BACKGROUND OF THE INVENTION

1. Field of the Invention

This invention relates to a keyboard tray having a mouse support that can slide out either side of the tray to an open position. When in an open position, that part of the mouse support that is located outside of the tray can slide forward relative to the tray.

2. Description of the Prior Art

It is known to have a mouse support that is slidably mounted in a curved passage of a keyboard tray. The mouse support can slide out of either end of the curved passage to a position where the end of the mouse support is located in front of an imaginary vertical plane extending through a front edge of the tray. The plane is perpendicular to an imaginary centre line of the tray extending through the front edge. Since the passage is curved, the mouse support must also have a curved shape to slidably fit within the passage. A lower portion of the passage is usually made from metal and it is significantly more expensive to provide a curved passage than it is to provide a straight or rectangular passage. Further, it is generally easier to slide a mouse support out either side of a rectangular passage than it is to slide a curved mouse support out of a curved passage. With previous designs, the mouse support can sometimes slide back into the passage when a mouse is being moved on the mouse support due to the movement of the mouse. For the comfort of a user, it is sometimes desirable to provide a mouse support that will extend beyond a front of the keyboard tray when the mouse support is fully extended. With previous mouse supports that are located in a curved passage, the mouse support cannot be adjusted while the mouse support remains in the fully extended position.

SUMMARY OF THE INVENTION

It is an object of the present invention to provide a mouse support that can slide out either end of a passage having a generally rectangular shape where the mouse support can be moved forward when it is in a fully extended position so that an end of the mouse support extends beyond a front of the tray in which the passage is located.

A keyboard tray can be mounted on an articulating arm. The tray has an upper portion and a lower portion that together define a passage extending through the tray from side to side. The tray has two sides, a foremost edge and a back edge. A mouse support has two ends, a front and a rear, the mouse support being sidably mounted within the passage and having a closed position and extended positions. The front of the mouse support generally converges toward the rear from each end to a centre of the mouse support, the mouse support being narrower at the center than at the ends. An extended portion of the mouse support is movable from one of said extended positions in a forward direction relative to the tray and returnable to the one of the extended positions.

In a further embodiment, the mouse support is mounted within a passage of a keyboard tray and has a closed position and a plurality of extended positions. The front of the mouse support converges from the ends to a center of the mouse support. In the closed position, the center of the mouse support is substantially equidistant from the sides of the tray. In the extended positions, an extended portion of the mouse support is movable in a forward direction relative to the tray.

A keyboard tray can be mounted on an articulating arm. The tray has a passage therein extending from side to side. A mouse support having two ends is slidably mounted within the passage and has a closed position and extended positions. The mouse support has a front edge that converges toward a center of the mouse support, the mouse support being narrower at the center than at the ends. When in an extended position, an outer end of the mouse support is movable in a forward direction relative to the tray.

BRIEF DESCRIPTION OF THE DRAWINGS

FIG. 14 is a partial perspective view of an upper surface of the mouse support showing a spring loaded projection.

DETAILED DESCRIPTION OF A PREFERRED EMBODIMENT

Figure 1:
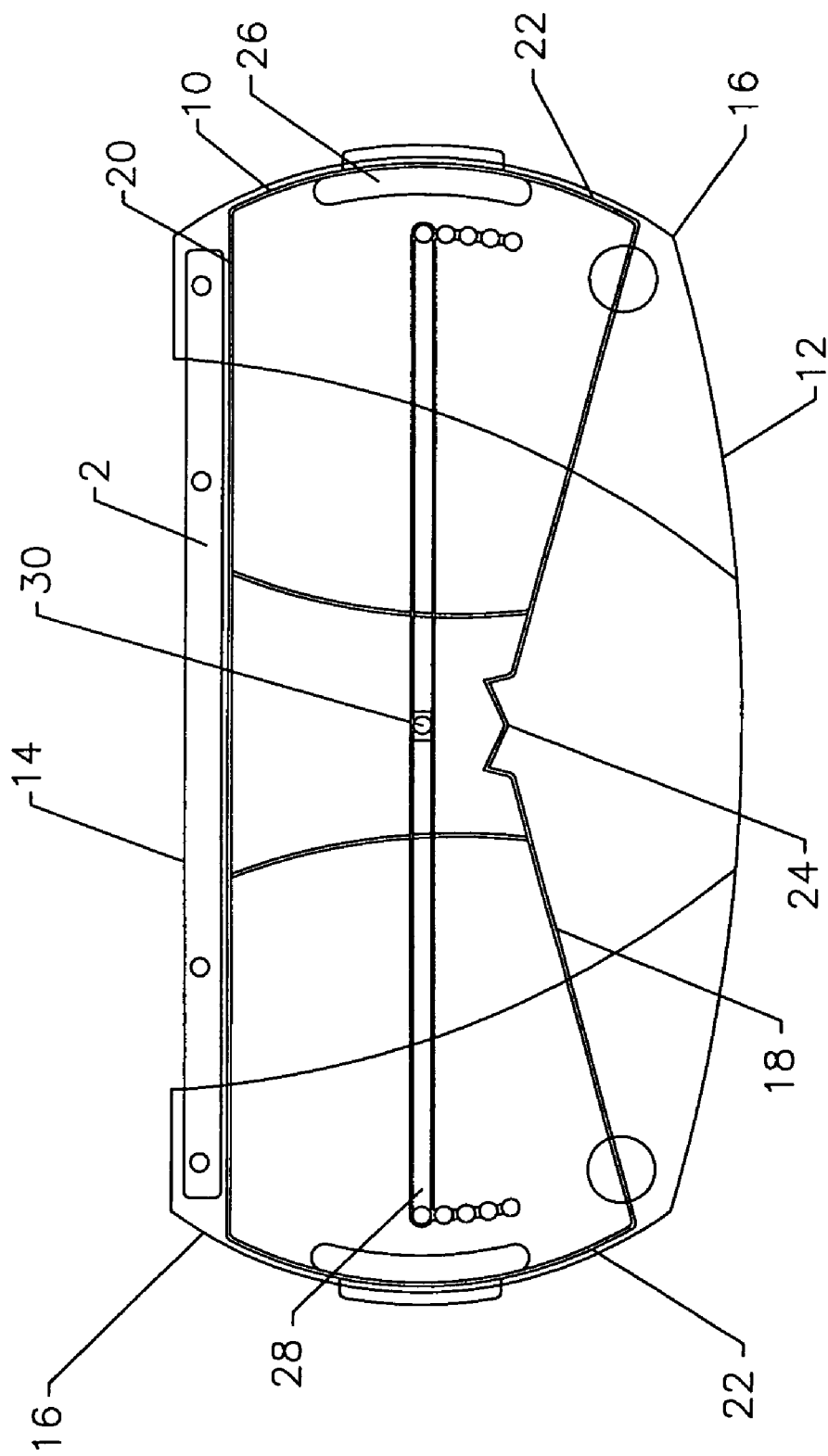
In FIG. 1, there is shown a top view of a mouse support in a closed position within a keyboard tray.
Figure 2:
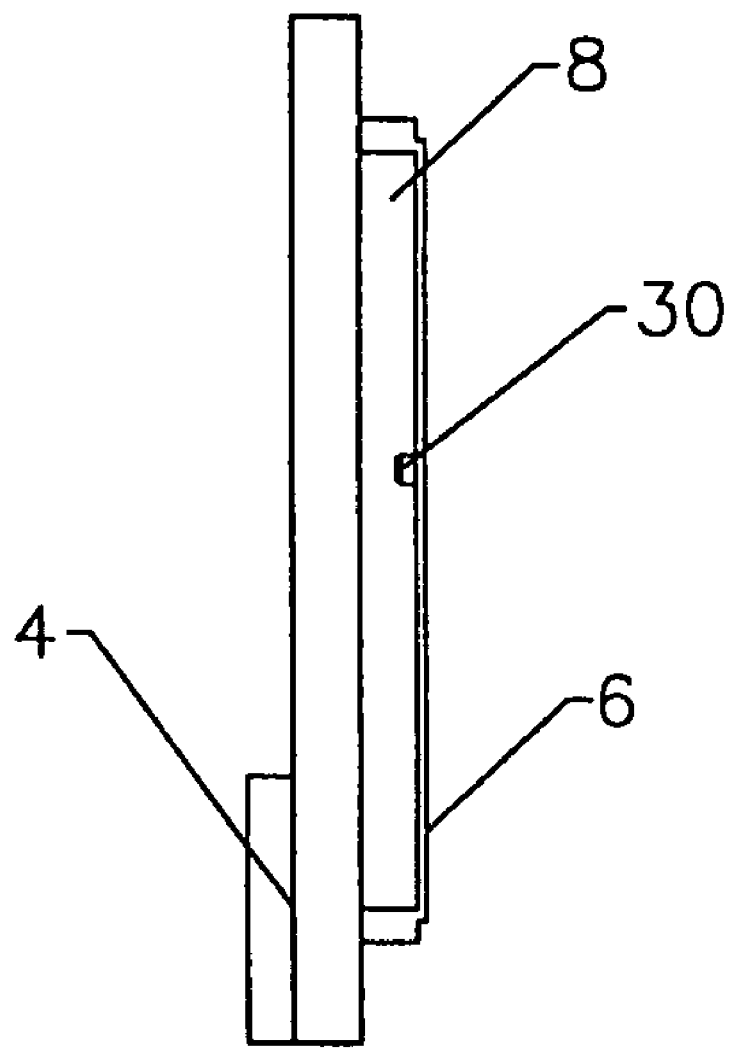
FIG. 2 is an end view of the tray with the mouse support removed.

In FIGS. 1 and 2, a keyboard tray 2 has an upper portion 4 and a lower portion 6 with a passage 8 located therein. A mouse support 10 is slidably mounted within the passage 8. While the mouse support would ordinarily be obscured by the upper portion 4 of the keyboard tray 2, FIG. 1 and FIGS. 3 to 6 have been drawn as though the upper portion of the keyboard tray is transparent so that the shape and position of the mouse support within the passage can be clearly seen. The mouse support has been deleted from FIG. 2 to expose the passage 8.

The tray 2 has a foremost edge 12, back edge 14 and two sides 16. The mouse support 10 has a front 18, a rear 20 and two ends 22. It can be seen that the front 18 converges toward the rear 20 from the end toward a central portion 24. It can also be seen that the ends 22 are rounded outward and have handles 26 located therein. The mouse support 10 is slightly longer than a width of the keyboard tray 2 so that when the mouse support is in the closed position relative to the tray shown in FIG. 1, the ends 22 extend beyond the sides 16 of the tray.

The mouse support 10 has a groove 28 extending longitudinally between the ends 22. The groove terminates before the handle at each end is reached. The groove is sized and shaped to receive a projection 30, which is mounted within a fixed position within the passage 8. The groove 28 and projection 30 provide a guide and retainer respectively for the movement of the mouse support relative to the tray. The guide and retainer can be reversed so that the passage contains the guide and the mouse support contains the retainer. However, it is preferable to have the retainer in the passage and the guide located within the mouse support as is shown in the drawings. Preferably, the groove is located in an underside of the mouse support and the retainer extends upward from a base of the passage.

Figure 3:
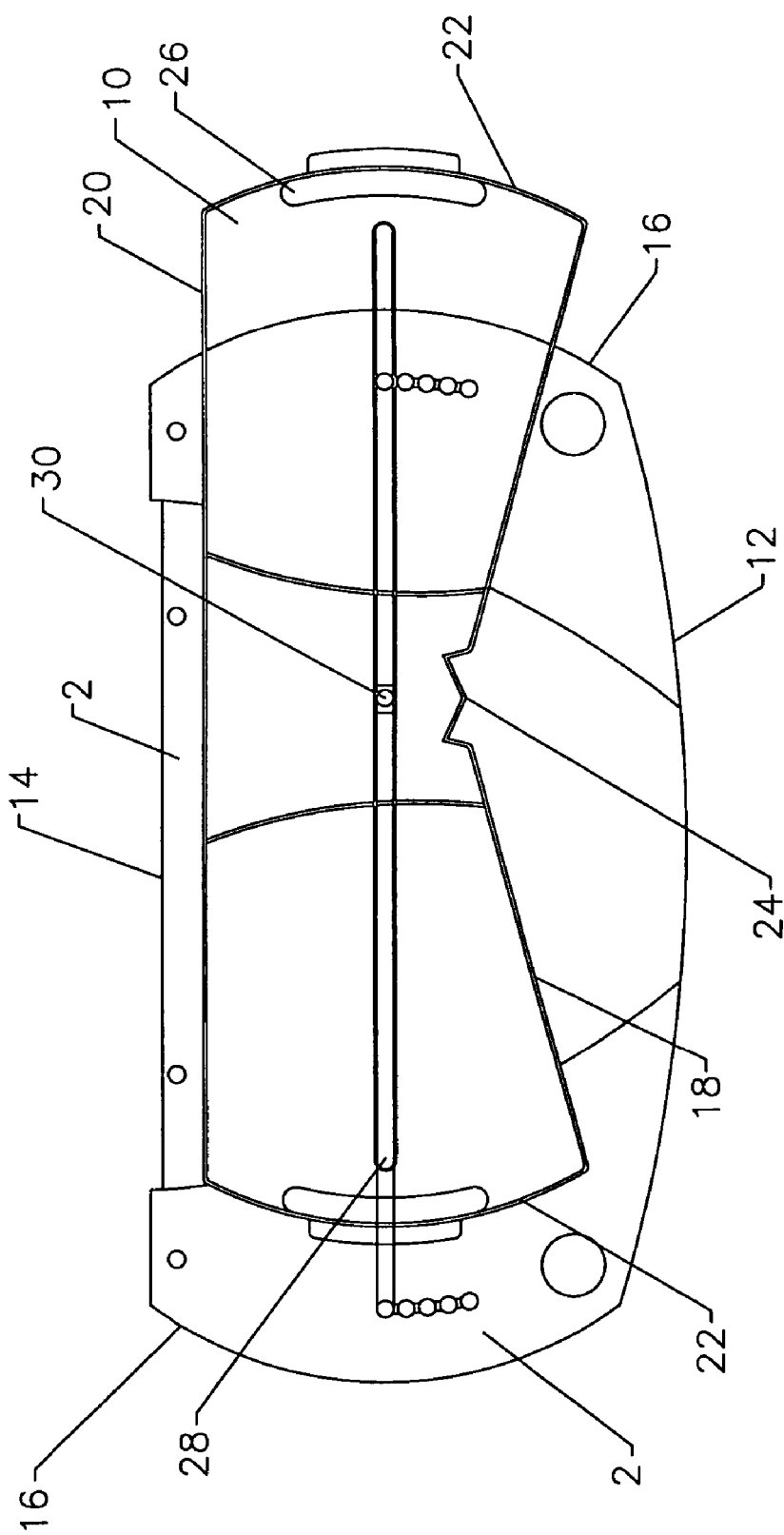
FIG. 3 is a top view of a mouse support in a keyboard tray where the mouse support is in a partially open position.
Figure 4:
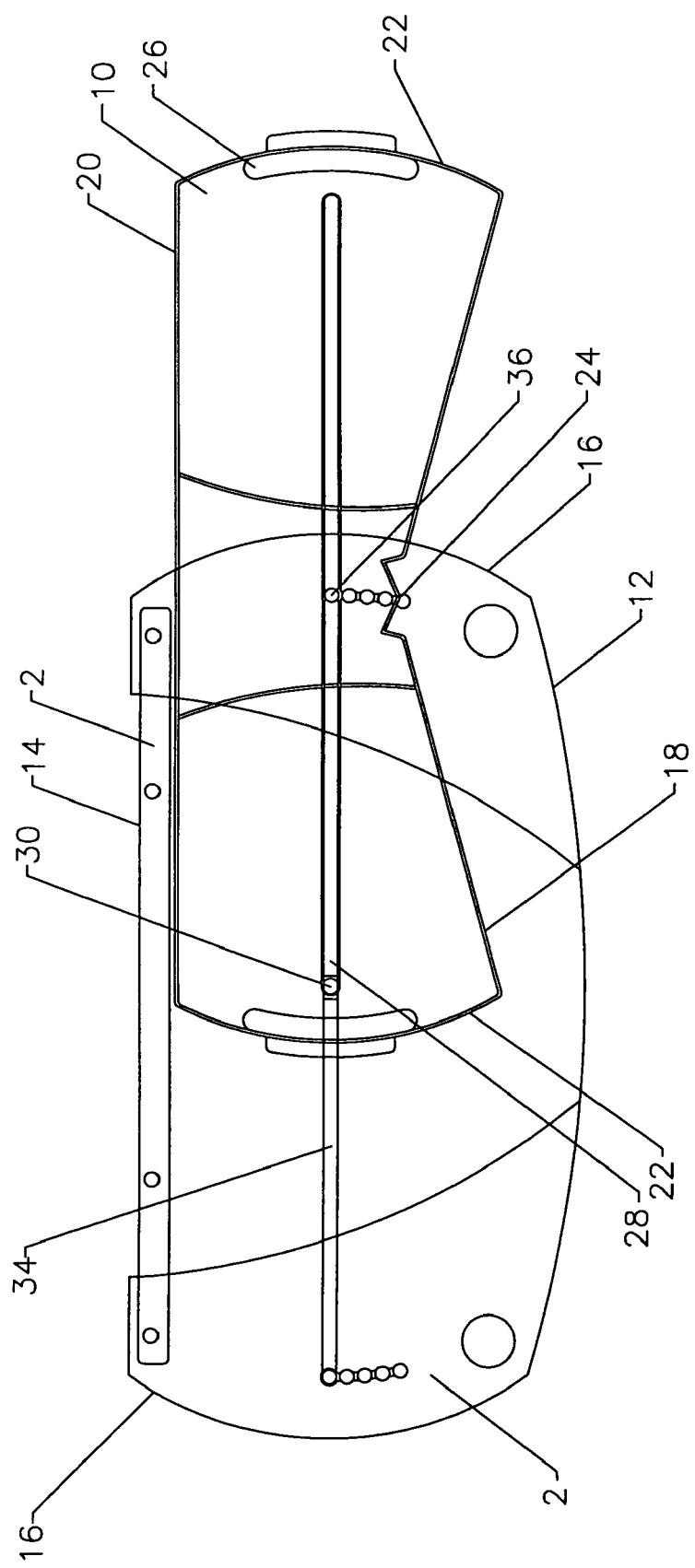
FIG. 4 is a top view of a mouse support slidably mounted in a keyboard tray wherein the mouse support is in a fully open position.

In FIGS. 3 to 6, the same reference numerals are used to describe those components that are identical to the components shown in FIGS. 1 and 2. In FIG. 3, the mouse support 10 is in an extended position, but is only partially extended beyond one side 16 of the tray 2. In FIG. 4, the mouse support is further extended beyond one of the sides 16 to a fully extended position. In the fully extended position, the projection 30 is located at an inner end 32 of the groove 28.

Figure 5:
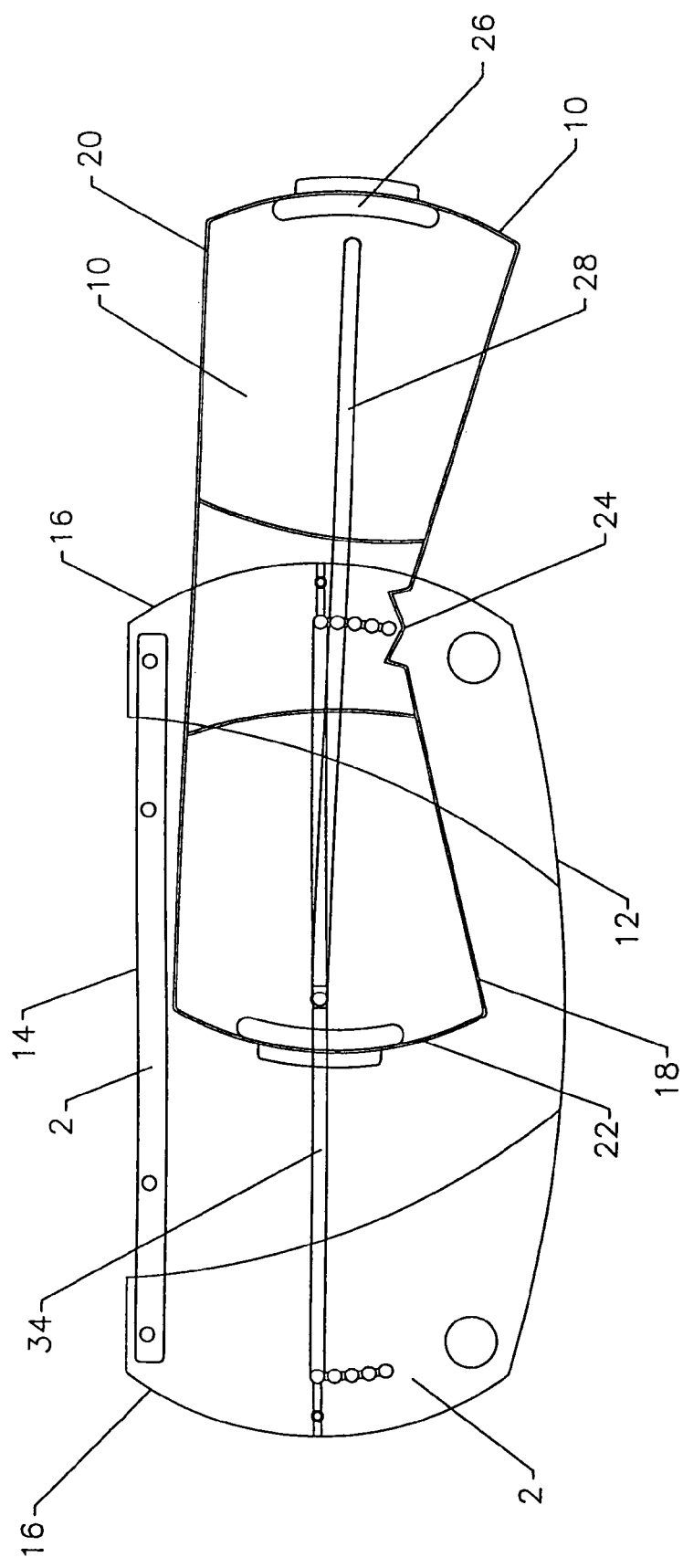
FIG. 5 is a top view of a mouse support in an open position where an end of the mouse support is in a partially forward relative to the keyboard tray.
Figure 6:
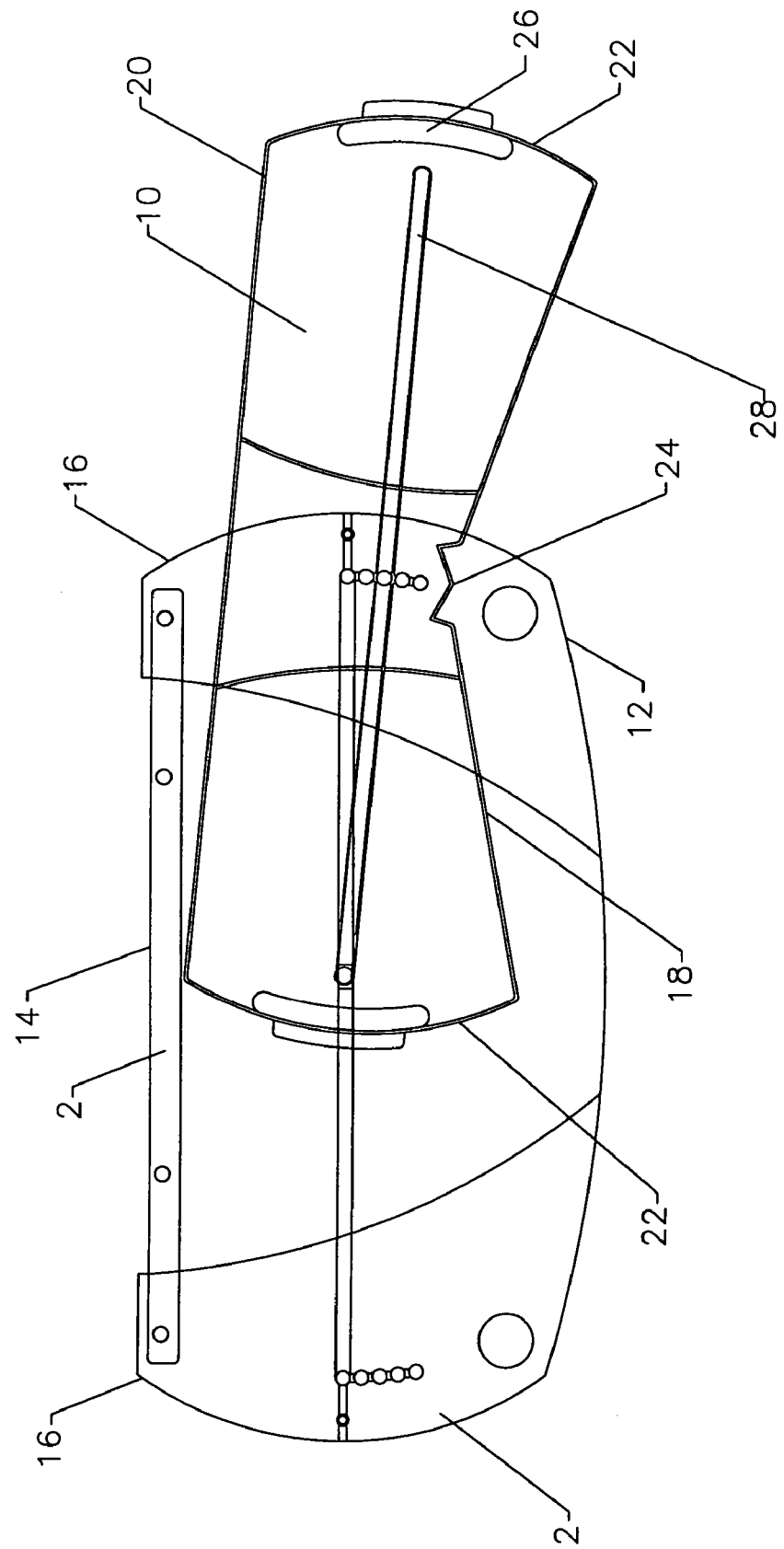
FIG. 6 is a top view of a mouse support in a keyboard tray where the mouse support is in the fully extended position and a full forward position.

In FIG. 5, the outer end of the mouse support has been moved partially forward relative to the tray 2. In FIG. 6, the mouse support has been pivoted further forward to a maximum forward position. It can be seen that part of the outer end of the mouse support extends beyond the foremost edge of the tray. From the position shown in FIG. 5, the outer end of the mouse support can be moved forward to the position shown in FIG. 6 or rearward to the position shown in FIG. 4. From the position shown in FIG. 6, the outer end of the mouse support can be moved rearward to the position shown in FIG. 5 and further rearward to the position shown in FIG. 4. Preferably, the passage 8 and centre portion of the mouse support have corresponding ridges and indentations thereon so that the mouse support can be snugly held relative to the keyboard tray in any of the three positions shown in FIGS. 4, 5, and 6.

Figure 7:
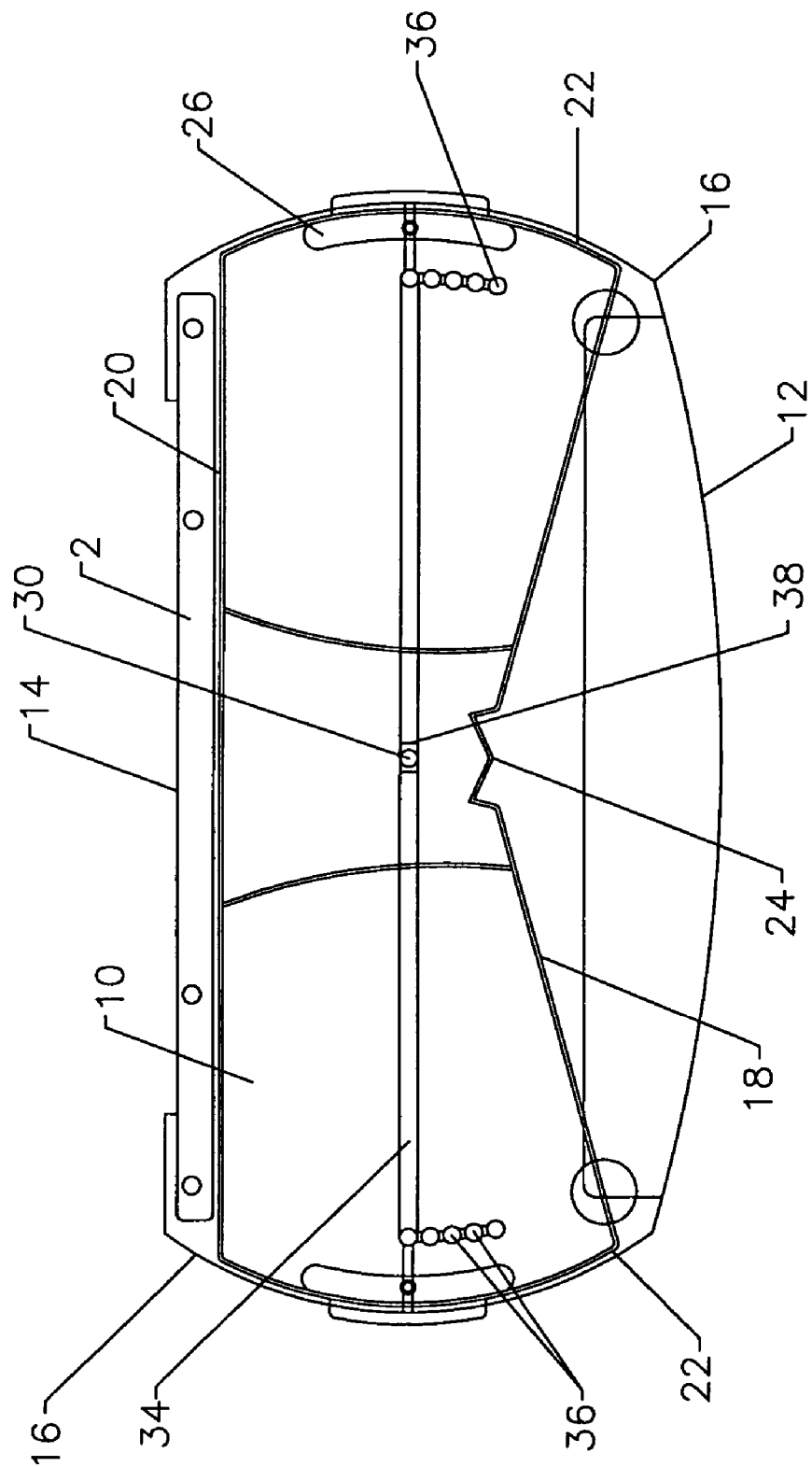
FIG. 7 is a schematic top view of the tray and mouse support in a closed position with a groove in the mouse support deleted to expose a channel in an underside of the tray.
Figure 8:
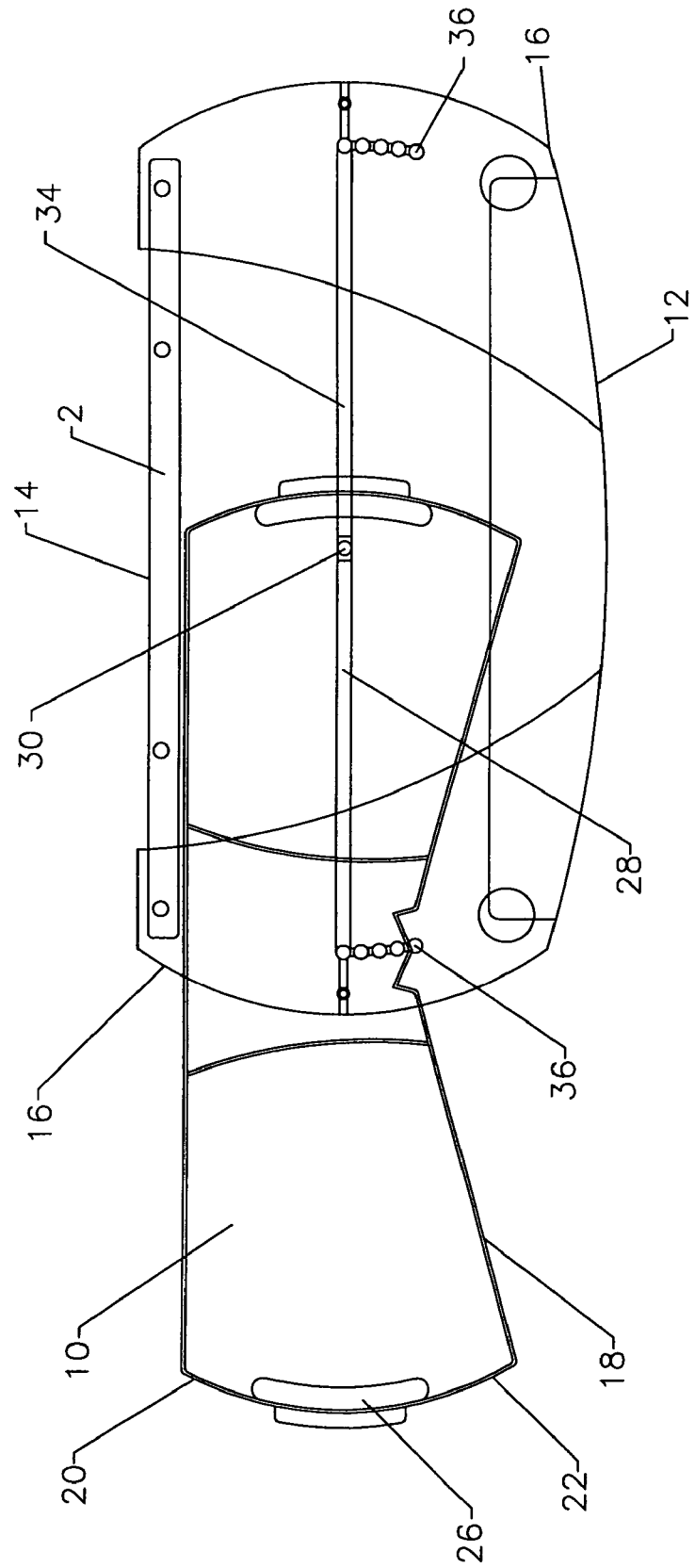
FIG. 8 is a schematic top view of the mouse support in a fully extended rearward position with that part of the groove that is located beneath the channel deleted.
Figure 9:
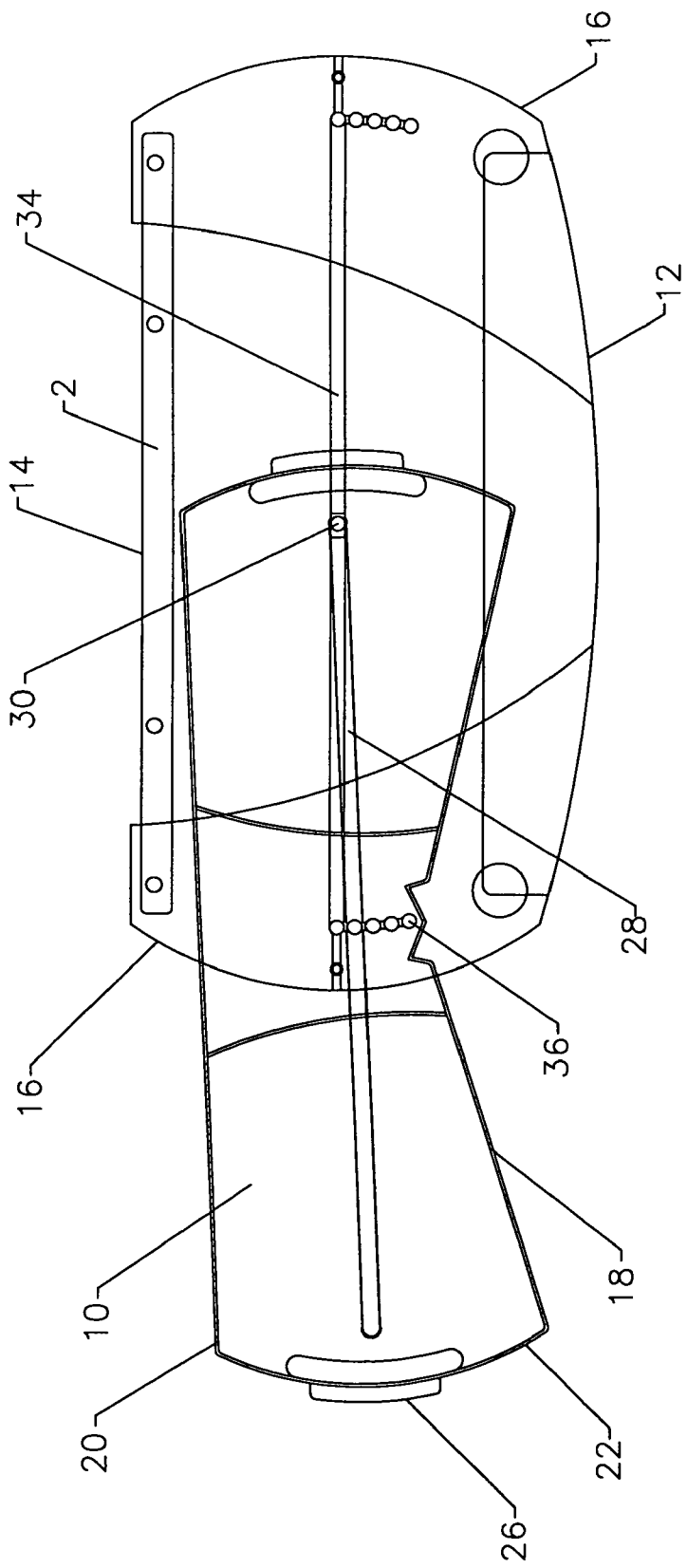
FIG. 9 is a schematic top view of the mouse support in a fully extended first forward position.
Figure 10:
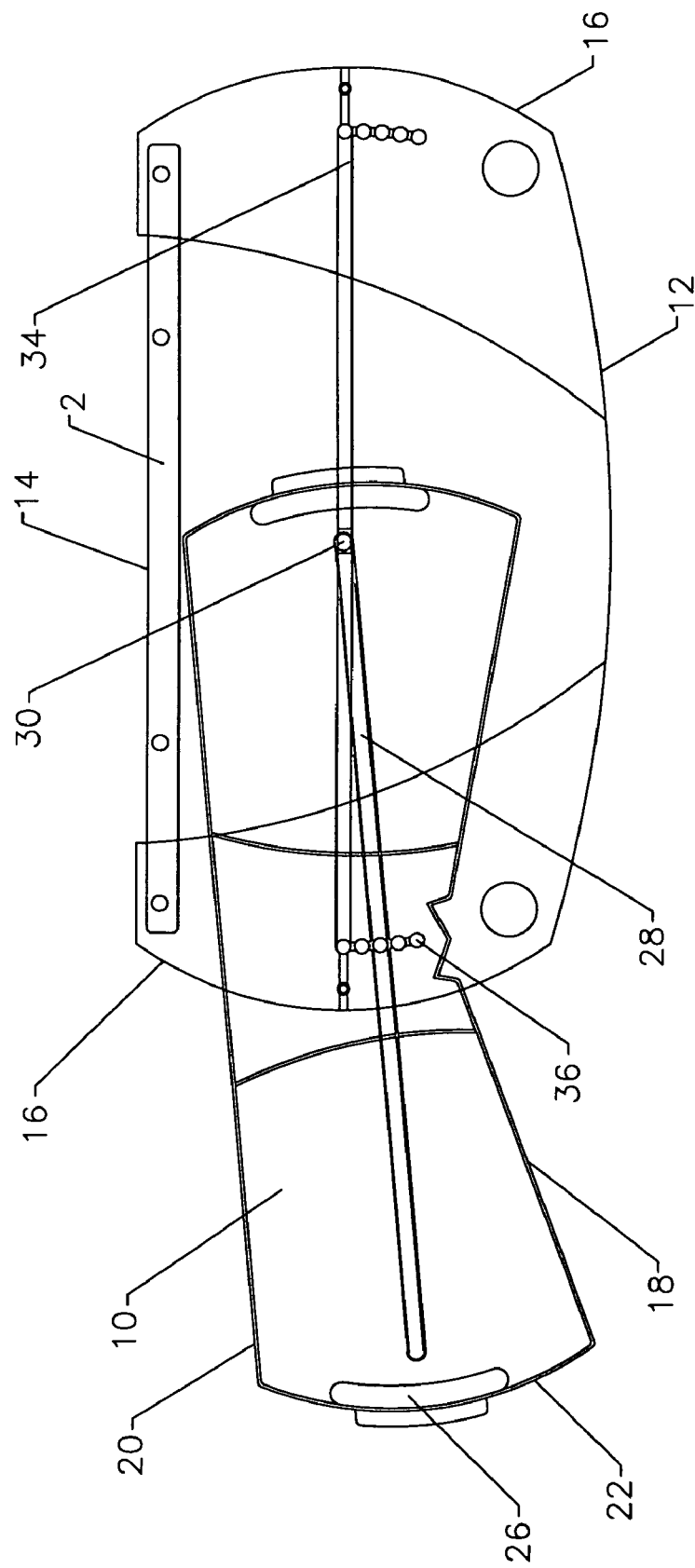
FIG. 10 is a schematic top view of the mouse support in a fully extended second forward position.
Figure 11:
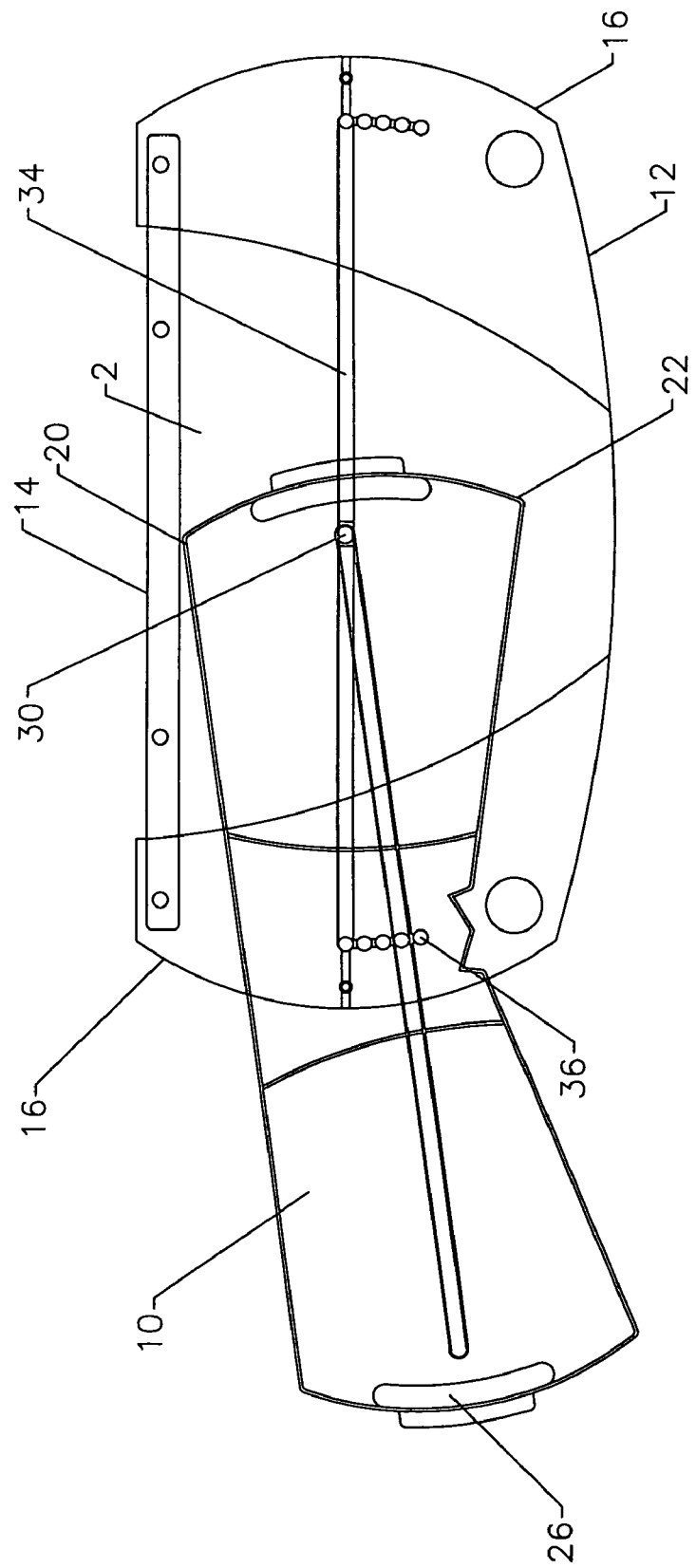
FIG. 11 is a schematic top view of the mouse support in a fully extended third forward position.
Figure 12:
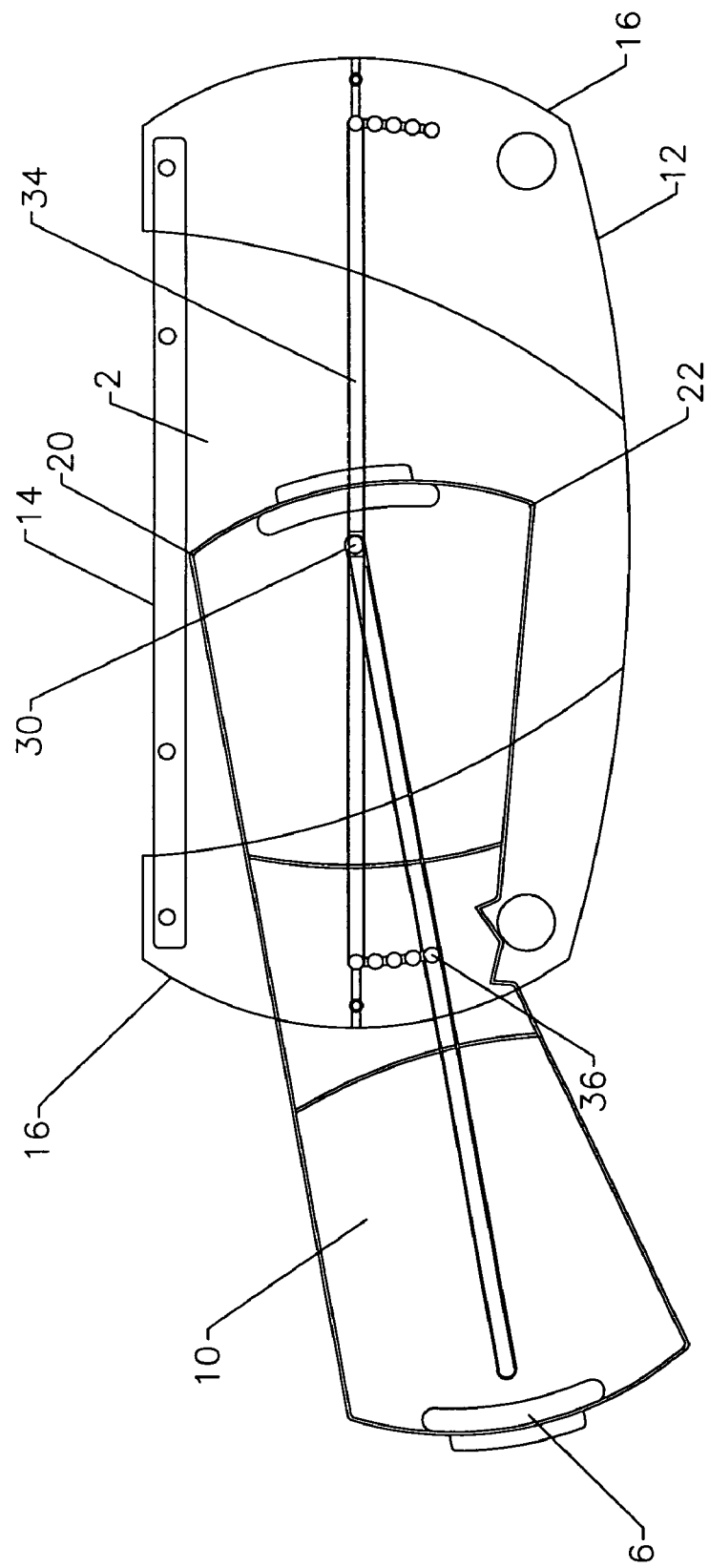
FIG. 12 is a schematic top view of the mouse support in a fully extended fourth forward position.

In FIGS. 7 to 12, the mouse support 10 is shown in various positions relative to the tray 2. In FIGS. 7 and 8, the groove 28 has been deleted to expose a channel 34 that is located in the underside of the tray 2 with a plurality of détentes 36 also on the underside of the tray 2. The channel 34 is located above the mouse support 10. The détentes 36 are located near each side of the tray 2. The channel 34 has two ridges 38 located at a centre of the channel equidistant between the two sides. The tray has a spring loaded protrusion (not shown in FIGS. 7 to 12) that is located to ride in the channel 34 and détentes 36. As the mouse support moves within the passage (not shown in FIGS. 7 to 12) the spring loaded protrusion is located substantially at a center of the mouse support 10 above the group 28. When the mouse support is in the closed position shown in FIG. 7, the protrusion is located between the two ridges 38. The two ridges provide a détente. As the mouse support is pulled sideways out of the passage to the fully extended rearward position shown in FIG. 8 the protrusion moves along the channel 34 into a first détente 36. In the first intermediate position shown in FIG. 9, the protrusion moves into the second détente 36. In FIG. 10, the protrusion moves into the third détente 36 and in FIG. 11, the protrusion moves into the fourth détente 36. In FIG. 12, the protrusion moves into the fifth détente 36 and the mouse support is in the fully extended and most forward position relative to the tray. In all of FIGS. 8 to 12 inclusive, the mouse support is in a fully extended position out one side of the tray. In each of the positions shown in FIGS. 7 to 12, an additional force must be exerted on the mouse support to move the mouse support out of the position shown and into another position. In other words, the mouse support is locked in position relative to the tray in each of the positions shown in FIGS. 7 to 12. The protrusion, which is preferably spring loaded, has been deleted to expose the projection 30. In the drawings, both the mouse support 10 and the keyboard tray 2 have been shown as being transparent so that the groove 28 and channel 34 are visible in a top view. The channel 34 is located beneath the keyboard tray 2 and will not be visible in a top view when the tray is made from opaque material. Similarly, the groove 28 in the mouse support 10 is located on an underside of the mouse support and there is a layer of material that forms part of the mouse support that is located along the top of the groove 28. By referring to FIG. 2, it can be seen that there is a gap between a top of the projection 30 and the upper portion of the mouse support 4. The gap can be smaller than that shown in FIG. 2 as long as there is sufficient distance for the thickness of material above the groove 28.

Figure 13:
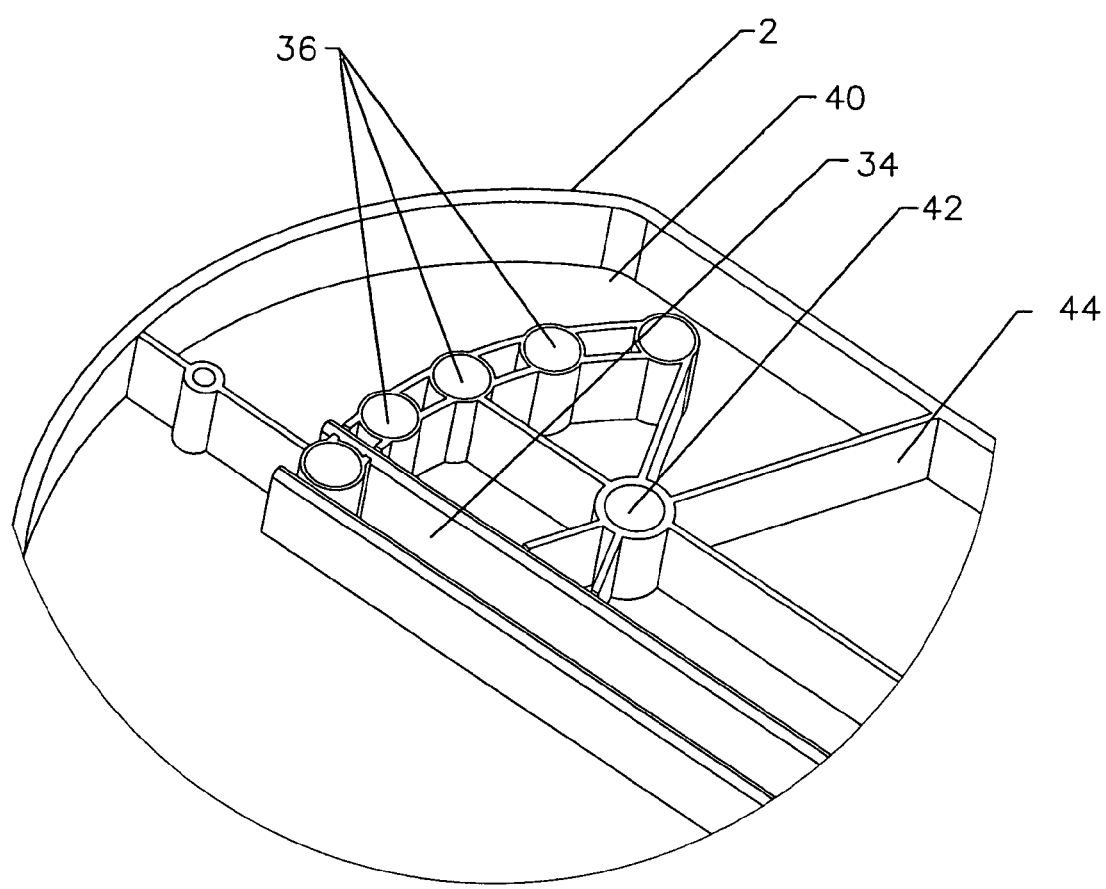
FIG. 13 is a partial perspective view of an underside of the tray showing a channel and détentes.

In FIG. 13, there is shown a partial perspective view of an underside 40 of an upper portion of the tray 2. The channel 34 can be seen as well as the détentes 36 located at one end of the tray. The détentes 36 at the other end of the tray (not shown in FIG. 13) are identical to the détentes that are shown and are symmetrical about an imaginary centre line extending from front to rear through the tray. It can also be seen that the tray 2 has various cylinders 42 and ridges 44 that make up support structure for the tray.

In FIG. 14, there is shown a partial perspective view of the mouse support 10. It can be seen that a protrusion 46 is located in an approximate centre of the mouse support 10 straddling an imaginary centre line extending from front to rear. The protrusion is preferably spring loaded so that it will automatically move inward when sufficient force is extended to move the mouse support from one position to another. The protrusion 46 is the spring loaded protrusion described, but not shown, in FIGS. 7 to 12. The protrusion 46 can be spring loaded in various ways. However, it is preferred that the protrusion be spring loaded by simply having a surface of the mouse support cut by two parallel slots 48 that extend around the protrusion in a U-shape so that the protrusion 46 can move up and down much like a spring board in a swimming pool due to the resilience of the plastic material from which the mouse support 10 is made.

While the mouse support shown in FIGS. 3 to 6 extends out the right side of the tray when viewed from the top, the mouse support is symmetrical about an imaginary centre line 34 and can just as easily slide out the left hand side of the tray 2 to the same positions that are shown for the right side in FIGS. 3 to 6. Since the mouse support slides manually relative to the tray, there are an infinite number of open or partially open positions of the mouse support relative to the tray within the range between the fully closed position and the fully open and maximum forward position shown in FIG. 6. The mouse support can be manually pulled out either side of the tray. It is necessary to first pull the mouse support out of the tray sideways and to then pull the mouse support forward. The mouse support can then be moved between the position shown in FIG. 1 and the position shown in FIG. 6. In FIGS. 7 to 12, the mouse support extends out the left hand side of the tray.

The passage 8 has a rectangular shape and preferably the lower portion is made from metal and the upper portion is made from molded plastic preferably the mouse support is also made from molded plastic in the fully extended and maximum forward position shown in FIG. 6, an inner portion of the front is generally parallel to the front and rear edges (not shown) under the passage.

The mouse support is referred to as being an angular mouse support because the front 18 extends at an angle relative to the rear 20. Various shapes of the front edge of the mouse support will be suitable as long as the front edge generally converges relative to the back edge towards a center of the mouse support. Preferably, the mouse support has four corners that together form an imaginary rectangle that is sized to slidably fit within the passage. While the mouse support has one closed position, it has a plurality of extended positions and a plurality of forward positions. The forward positions can also be described as extended positions. The channel 34 (best shown in FIG. 7) has two portions (at either side of the tray) that curve forward. The two portions contain a plurality of détentes into which the spring mounted protrusion shown in FIG. 14 can removably fit.

I claim:

1. A keyboard tray for mounting on an articulating arm, said tray comprising an upper portion and a lower portion that together define a passage extending through said tray from side to side, said tray having two sides, a foremost edge and a back edge, a mouse support having two ends, a front and a rear, said two ends, front and rear defining a perimeter of said mouse support, said mouse support being slidably mounted within said passage and having a closed position and extended positions, said front of said mouse support generally converging toward said rear from each end to a centre of said mouse support, said mouse support being narrower at said center than at said ends, said rear of said mouse support being substantially straight from one end to the other, an extended portion of said mouse support being movable from one of said extended positions in a forward direction relative to said tray and returnable to one of said extended positions.

2. A keyboard tray as claimed in claim 1 wherein said mouse support is shaped to be movable in said forward direction beyond a forwardmost point in said foremost edge of said tray.

3. A keyboard tray as claimed in any one of claims 1 or 2 wherein said mouse support has one of a guide and retainer located thereon and said passage has the other of said retainer and guide respectively located thereon, said retainer and guide corresponding to one another so that said retainer can travel within said guide and said mouse support can alternately slide beyond either side of said passage, said retainer and guide limiting a distance at each end of said mouse support that said mouse support can slide out either side of said passage.

4. A keyboard tray as claimed in any one of claims 1 or 2 wherein said mouse support has one of a guide and retainer located thereon, said passage having the other of a retainer and guide respectively located thereon, said retainer and guide corresponding to one another so that said retainer can travel within said guide as said mouse support moves relative to said passage, said mouse support pivoting relative to a pivot point through said retainer for forward or rearward movement of said mouse support relative to said tray when said mouse support is in said extended position.

5. A keyboard tray as claimed in claim 1 wherein said mouse support has a fully extended position out either side of said tray.

6. A keyboard tray as claimed in claim 1 wherein said ends of said mouse support are curved outward with handles therein.

7. A keyboard tray as claimed in claim 1 wherein said mouse support is longer than said tray.

8. A keyboard tray as claimed in claim 1 wherein in said closed position, said mouse support is centred within said tray with said ends extending beyond said sides.

9. A keyboard tray as claimed in claim 1 wherein in said closed position, said mouse support is symmetrical about a centre line of said tray extending from said foremost edge to said back edge.

10. A keyboard tray as claimed in claim 1 wherein said passage has a rectangular shape when viewed from a top, said mouse support having four corners that together form an imaginary rectangle that is sized to slidably fit within said passage.

11. A keyboard tray as claimed in any one of claims 1 or 2 wherein when said mouse support is in said one extended position, said mouse support has a plurality of forward positions.

12. A keyboard tray as claimed in any one of claims 1 or 2 wherein when said mouse support is in said one extended position, said mouse support has a plurality of forward positions, said keyboard tray having a plurality of détentes, there being one détente for each forward position.

13. A keyboard tray as claimed in claim 1 wherein said keyboard tray has a projection substantially centrally located in said passage, said projection extending into a groove in said mouse support, said groove extending between said ends of said mouse support.

14. A keyboard tray as claimed in claim 13 wherein said keyboard tray has a channel in an underside thereof, said channel being located above said groove, said mouse support having a protrusion extending upward therefrom into said channel.

15. A keyboard tray as claimed in claim 14 wherein said protrusion is spring loaded.

16. A keyboard tray as claimed in claim 15 wherein said channel has a détente located at a center thereof and said channel having two portions that curve forward, there being one of said two portions at each side of said tray, said portions containing a plurality of détentes, said détentes being sized and shaped to removably receive said protrusion.

17. A keyboard tray for mounting on an articulating arm, said tray comprising an upper portion and a lower portion that together define a passage extending through said tray from side to side, said tray having two sides, a foremost edge and a back edge, a mouse support having two ends, a front and a rear said two ends, front and rear defining a perimeter of said mouse support, said mouse support being slidably mounted within said passage and having a closed position in said tray and a plurality of extended positions, said rear being straight from one end to the other, said mouse support converging from said ends to a center of said mouse support such that said mouse support being narrower at said center than at said ends, in said closed position said center of said mouse support being substantially equidistant from said sides of said tray, in said extended positions, an extended portion of said mouse support being moveable in a forward direction relative to said tray to a forward position.

18. A keyboard tray as claimed in claim 17 wherein there are a plurality of forward positions on each side of said tray.

19. A keyboard tray as claimed in claim 18 wherein there is a détente for each forward position.

20. A keyboard tray as claimed in claim 17 wherein said mouse support is constructed to be pivoted when in an extended position either forward or backward.

* * * * *